United States Patent
Birsan et al.

(10) Patent No.: US 7,411,913 B2
(45) Date of Patent: Aug. 12, 2008

(54) PROCESS FOR AUTOMATICALLY DETECTING THE THROUGHPUT OF A NETWORK, PARTICULARLY OF THE CAN BUS TYPE AND FOR CONFIGURING WITH THE DETECTED THROUGHPUT BY TRANSITION ANALYSIS, AND CORRESPONDING DEVICE

(75) Inventors: Laurentiu Birsan, Nantes (FR); Marc Laurent, Nantes (FR); Thierry Delalande, Nantes (FR); Jean-Sebastien Berthy, Petit-Mars (FR)

(73) Assignee: Atmel Nantes SA, Nantes Cedex (FR)

( * ) Notice: Subject to any disclaimer, the term of this patent is extended or adjusted under 35 U.S.C. 154(b) by 589 days.

(21) Appl. No.: 11/039,175

(22) Filed: Jan. 19, 2005

(65) Prior Publication Data
US 2005/0180442 A1     Aug. 18, 2005

(30) Foreign Application Priority Data
Jan. 20, 2004   (FR) .................................. 04 00521

(51) Int. Cl.
*G01R 31/08*     (2006.01)
(52) U.S. Cl. ........................ 370/241; 370/257
(58) Field of Classification Search ................ 370/241, 370/252, 254, 257, 410
See application file for complete search history.

(56) References Cited

U.S. PATENT DOCUMENTS

| | | | | |
|---|---|---|---|---|
| 5,574,848 A | * | 11/1996 | Thomson | 714/2 |
| 5,600,782 A | * | 2/1997 | Thomson | 714/4 |
| 6,600,723 B1 | * | 7/2003 | Reeb et al. | 370/245 |
| 2005/0058076 A1 | * | 3/2005 | Richardson et al. | 370/241 |

OTHER PUBLICATIONS

G. Leen and D. Heffernan, "TTCAN: A New Time-Triggered Controller Area Network", *Microprocessor and Microsystems*, Dec. 14, 2001, pp. 77-94.
Holger Zeltwanger, "An Inside Look at the Fundamentals of CAN", *CAN in Automation Users and Manufacturers Group e. V.*, Jan. 95, No. 1, pp. 51-55.

* cited by examiner

*Primary Examiner*—Chirag G Shah
*Assistant Examiner*—Yong Zhou
(74) *Attorney, Agent, or Firm*—Westman, Champlin & Kelly, P.A.

(57) ABSTRACT

A process for automatically detecting and configuring with the throughput of a network, in which a device: (a) goes into a listen mode; (b) obtains a triplet of successive transitions in a transmitted signal, the triplet delimiting first and second signal levels, one dominant and the other recessive; (c) measures the duration of each of the first and second levels; (d) as a function of the measured durations, obtains a new throughput configuration by determining values for parameters that define a bit length $L_{BIT}$; (e) validates the new throughput configuration; (g) if at least one throughput adaptation condition is verified, goes into a normal mode, otherwise obtains a next transition of the signal, which delimits with the last previous transition a new level of the signal, then measures the duration of the new level and reiterates steps (d) to (g) taking account of the new signal level.

14 Claims, 6 Drawing Sheets

| n | Lsync | Lprs | Lphs1 | Lphs2 | sample point at ...% of the bit length |
|---|---|---|---|---|---|
| <8 | 1 | 3 | 2 | 2 | ~80% |
| 8 | 1 | 3 | 2 | 2 | 80% |
| 9 | 1 | 3 | 3 | 2 | 78% |
| 10 | 1 | 3 | 3 | 3 | 70% |
| 11 | 1 | 4 | 3 | 3 | 73% |
| 12 | 1 | 4 | 4 | 3 | 75% |
| 13 | 1 | 4 | 4 | 4 | 69% |
| 14 | 1 | 5 | 4 | 4 | 71% |
| 15 | 1 | 5 | 5 | 4 | 73% |
| 16 | 1 | 5 | 5 | 5 | 69% |
| 17 | 1 | 6 | 5 | 5 | 71% |
| 18 | 1 | 6 | 6 | 5 | 72% |
| 19 | 1 | 6 | 6 | 6 | 68% |
| 20 | 1 | 7 | 6 | 6 | 70% |
| 21 | 1 | 7 | 7 | 6 | 71% |
| 22 | 1 | 7 | 7 | 7 | 68% |
| 23 | 1 | 8 | 7 | 7 | 70% |
| 24 | 1 | 8 | 8 | 7 | 71% |
| 25 | 1 | 8 | 8 | 8 | 68% |
| >25 | 1 | 8 | 8 | 8 | ~70% |

PROCESS FOR AUTOMATICALLY DETECTING THE THROUGHPUT OF A NETWORK, PARTICULARLY OF THE CAN BUS TYPE AND FOR CONFIGURING WITH THE DETECTED THROUGHPUT BY TRANSITION ANALYSIS, AND CORRESPONDING DEVICE

CROSS-REFERENCE TO RELATED APPLICATION

The present application claims priority of French Application No. FR 04/00521, filed Jan. 20, 2004, not in English.

FIELD OF THE INVENTION

The field of the invention is that of communication networks.

More exactly, the invention relates to a process for automatically detecting, via a device connected to a network, the throughput of this network and for configuring the device with the detected throughput. The invention also relates to the device implementing this process.

The invention applies particularly, but not exclusively, in the situation where the network is of the CAN bus type.

BACKGROUND OF THE INVENTION

By way of illustration and in the interests of simplification, a description will now be given of the prior art and the drawbacks thereof in the aforementioned situation where the network is of the CAN bus type.

It will be remembered that a CAN (Controller Area Network) is a serial bus that allows a plurality of devices, called "control units" and each including a CAN microcontroller, to be connected. This type of bus is mainly used today in the industrial field and in the car manufacturing field.

Typically, in a car, two CAN buses are used. One, known as a high speed (up to 1 Mb/s) CAN bus, allows control units to be interconnected that relate to the following elements or functionalities: instrument panel, engine, braking system (anti-lock), active suspension, transmission, etc. The other, known as a low speed (up to 125 kb/s) CAN bus allows control units to be interconnected that relate to the following elements or functionalities: instrument panel, lighting, air-conditioning, inflatable safety bags, door locking, electric windows, etc.

Each CAN bus implements a protocol of the same name (CAN protocol) which is a serial communication protocol supporting real-time systems with a high level of reliability in a restricted and harsh environment such as a factory, a workshop, car etc. The CAN protocol covers two of the seven layers of the open systems interconnection model (OSI) of the ISO, namely the physical layer (layer 1) and the data link layer (layer 2). For more information about the CAN bus, reference may be made to ISO standard 11898, inserted here for reference purposes.

The data link layer of the CAN protocol is such that each control unit is able to send and receive data. The data is carried on the bus in the form of asynchronous packets (also known as frames or messages) of specified format but of variable and limited length. As soon as the bus is free, any control unit connected to the bus is able to send a new packet. An interrupt mechanism for higher priority packets is provided, as well as a mechanism for settling conflicts arising from the simultaneous transmission of several packets on the bus when it is free.

Traditionally, when it is desired to connect a new control unit (in other words a new device including a CAN microcontroller which executes an application (layer 7 of the OSI model)) to a CAN bus, the following procedure is followed. The developer of the application executed by the CAN microcontroller must know the clock frequency of the CAN microcontroller (for example 12 MHz). He assumes furthermore that the throughput of the network takes one of a limited number of values (three values generally). For example, he assumes that the network throughput is equal to 100, 250 or 500 kb/s. For each of the three assumed values of the network throughput, he determines initially, and from knowledge of the clock frequency of the CAN microcontroller, a throughput configuration for the CAN microcontroller. He then develops the application in such a way that, in operation, the application loads a first throughput configuration associated with a first assumed value of the network throughput; if the application receives error messages, it loads a second throughput configuration associated with a second assumed value of the network throughput; and so on in such a way as to test (if necessary) the different pre-set throughput configurations.

One drawback of the aforementioned known technique is that it cannot be employed in situations where the clock frequency of the CAN microcontroller is unknown.

Another disadvantage of the aforementioned known technique is that it does not work if none of the network throughput assumptions is correct.

Yet another drawback of the aforementioned known technique is that, when several possible throughput configurations are tested successively, the CAN microcontroller actually upsets the CAN bus. This may even lead to the CAN microcontroller being ejected from the CAN bus.

SUMMARY OF THE INVENTION

The particular purpose of the invention is to overcome these different drawbacks of the prior art.

More exactly, one of the purposes of an embodiment of the present invention is to provide a process and a device for automatically detecting the throughput of a network and for configuring with the detected throughput, that do not require knowledge of the clock rate of the device, nor any assumptions about the throughput of the network.

Another purpose of an embodiment of the invention is to provide such a process and device that do not upset the network.

Another purpose of an embodiment of the invention is to provide such a process and device that are simple to implement and inexpensive.

These different purposes, together with others which will emerge subsequently, are fulfilled according to an embodiment of the invention by using a process for automatically detecting the throughput of a network and for configuring with the detected throughput via a device connected to the network, the network transmitting a signal on which messages are carried that include bits of length $L_{BIT}$ and of a dominant or recessive type. This process includes the following successive steps;

a) the device goes into a listen mode, in which it is able to receive messages coming from the network but is not able to send messages on the network;

b) the device obtains a triplet of successive transitions in the signal transmitted on the network, said triplet delimiting a first and second signal level, one dominant and the other recessive;

c) the device measures the duration, expressed as a period $T_H$ number of a clock of the device, of each of the first and second levels;

d) as a function of the measured lengths of the signal levels, the device obtains a new throughput configuration by determining values for parameters that define the bit length $L_{BIT}$;

e) the device validates the new throughput configuration;

g) if the device detects that at least one throughput adaptation condition is verified, it goes into a normal mode, otherwise it obtains a next transition of signal, which delimits with the last previous transition a new level of the signal, it measures the duration of the new level, expressed as a period number in $T_H$ of the device clock, and it reiterates steps (d) to (g) taking account of the new signal level.

The general principle of an embodiment of the invention therefore consists in going into a listen mode, making it possible not to upset the network, in order to make a calculation of the bit length $L_{BIT}$ (sometimes also called "TimeBit" in the remainder of the description) based on an analysis of the transitions presented by the signal transmitted on the network. The invention therefore requires neither knowledge of the device clock frequency, nor an assumption about the network throughput.

In an advantageous embodiment of the invention, the network is a CAN bus, and the device includes a CAN microcontroller, completed relative to a conventional CAN microcontroller so as to implement the process according to the invention for automatically detecting the throughput of the network and for configuring with the detected throughput.

It is assumed for example that the bit length $L_{BIT}$ is defined by:

a scalar BRP, such that: $TQ=BRP*T_H$ with TQ a unit of time and $T_H$ the period of the device clock;

lengths expressed as a time unit number TQ: length $L_{SYNC}$ of a synchronisation segment, length $L_{PRS}$ of propagation segment for the purpose of compensating for a physical delay on the CAN bus, lengths $L_{PHS1}$ and $L_{PHS2}$ of first and second phase segments allowing a sample point to be positioned.

To advantage, in this context, the step (d) itself includes the following steps:

(d0) the device updates two log registers, in such a way that:
after the first iteration of step (d), the registers contain the minimum P and the maximum G respectively of the durations of the first and second levels;
after each successive iteration of step (d), the registers are updated according to the following equation: if $G<X$, then G assumes the value X, otherwise P assumes the value X, with X the duration of said new signal level;

d(1) as a function of the content P and G of said log registers, the device obtains a number m allowing the bit length $L_{BIT}$ to be expressed as a function of the period $T_H$ of the device clock: $L_{BIT}=m*T_H$;

(d2) as a function of the previously obtained number m, the device obtains a maximum value $BRP_{MAX}$ of the scalar BRP knowing that:

i) $L_{BIT}=m*T_H=n*BRP*T_H$, hence: $m=n*BRP$ ii) $n=L_{BIT}/TQ$ iii) $n \leq n_{MAX}$, with $n_{MAX}$ a pre-set maximum time unit number TQ that the bit length $L_{BIT}$ may include;

(d3) as a function of the number m and of the maximum value $BRP_{MAX}$ previously obtained, the device obtains a value of the number n such that: $n=m/BRP_{MAX}$;

(d4) as a function of the number n previously obtained, the device obtains values for the length $L_{SYNC}$ of the synchronization segment, the length $L_{PRS}$ of the propagation segment and lengths $L_{PHS1}$ and $L_{PHS2}$ of the first and second phase segments.

To advantage, in step (d1), the value of the number m is given by the following equations:

$m=\min(2P-G, G-P)$, if $P<G<2P$, $m=\min(G-2P,P)$, if $2P<G<6P$, $m=P/2$, if $G=2P$, m is not calculated in the other cases.

According to a preferential variant, in step (d1), the conditions for applying the equations giving the value of the number m are modified as follows:

$m=\min(2P-G, G-P)$, if $P+P/k<G\leq 2(P-P/k)$, $m=\min(G-2P,P)$, if $2(P+P/k)<G<6(P-P/k)$, $m=P/2$, if $2(P-P/k)<G\leq 2(P+P/k)$, m is not calculated in the other cases, with k a pre-set whole number greater than or equal to 4, and preferentially equal to 8.

To advantage, in step (d4), a pre-set correspondence table is used, associating with each value of the number n a set of values for the length $L_{SYNC}$ of the synchronisation segment, the length $L_{PRS}$ of the propagation segment and the lengths $L_{PHS1}$ and $L_{PHS2}$ of the first and second phase segments.

In an advantageous embodiment of the invention, said at least one throughput adaptation: condition in step (g) is the receipt in the correct form (RxOK) of a message coming from the network.

Preferentially, step (g) is preceded by the following step:

f) if the device detects the proper receipt of the useful part of a message coming from the network, it provisionally goes into normal mode to send an acknowledgement field (ACK) on the network then goes back to listen mode, otherwise it obtains a next transition of the signal, which delimits with the last previous transition a new signal level, it measures the duration of the new level, expressed as a period $T_H$ number of the device clock, and it reiterates steps (d) to (g) taking account of the new signal level.

Sending the acknowledgement field (ACK) allows the other device that has issued the message to be informed that its message has been properly transmitted on the network and therefore not to send an error message. This characteristic of the invention is particularly advantageous in the situation where only the device of the invention being in a position to send an acknowledgement field (ACK) to the other device.

The invention also relates to a device that includes means allowing the implementation of any one of the embodiments of the aforementioned process. In this way, the invention relates to a device that includes:

means for toggling from a normal mode to a listen mode, in which means are activated for blocking messages sent by the device to the network, the device continuing to receive messages coming from the network;

means for obtaining a triplet of successive transitions in the signal transmitted on the network, said triplet delimiting a first and second level of the signal, one dominant and the other recessive;

means for measuring the duration, expressed as a period $T_H$ number of a device clock, of each of the first and second signal levels;

means for obtaining, as a function of the measured duration of the signal levels, a new throughput configuration by determining values for parameters defining the bit length $L_{BIT}$;

means for validating the new throughput configuration;

means for detecting that at least one throughput adaptation condition is verified;

means for toggling from listen mode to normal mode, activated in the event of positive detection by detection means;

means for obtaining a next signal transition, which delimits with the last previous transition a new signal level, and means for measuring the duration of the new level, expressed as a period $T_H$ number of the device clock, activated with said means for obtaining and validating a new throughput configuration and said means for detecting that at least one throughput adaptation condition is verified, in the event of negative detection by detection means, in such a way as to take account of the new signal level.

In an advantageous embodiment of the invention, the network is a CAN bus, and in that the device includes a CAN microcontroller completed relative to a conventional CAN microcontroller and itself including said means for automatically detecting the throughput of the network and for configuring with the detected throughput.

To advantage, the means for toggling from normal mode to listen mode include means for generating a mode selection signal (Autobaud), assuming the value "0" or "1" depending on whether the device is to operate in normal mode or listen mode respectively. Additionally, the completed CAN microcontroller includes a conventional CAN microcontroller modified so as to itself include said means for automatically detecting the network throughput and for configuring with the detected throughput, apart from said means for blocking sent messages. Lastly, the means for blocking sent messages include means for embodying the "OR" logic function between the mode selection signal and the send signal (TxDC') of the modified conventional CAN microcontroller, the output signal of the means for embodying the "OR" logic function constituting the send signal (TxDC) of the completed CAN microcontroller.

To advantage, the completed CAN microcontroller additionally includes loop means from the output to the input of the modified conventional CAN microcontroller, including:

means for embodying the "AND" logic function between the send signal (TxDC') of the modified conventional CAN microcontroller and the receive signal (RxDC) of the completed CAN microcontroller;

multiplexing means receiving at a first input the output signal of the means for embodying the "AND" logic function and at a second input the receive signal (RxDC) of the completed CAN microcontroller, the output signal of the multiplexing means constituting the receive signal (RxDC') of the modified conventional CAN microcontroller, the multiplexing means being controlled by the mode selection signal in such a way that the first or second input is selected depending on whether the mode selection signal assumes the value "1" or "0" respectively.

According to one advantageous characteristic, the completed CAN microcontroller additionally includes means for provisionally toggling from listen mode to normal mode, so as to send an acknowledgement field (ACK) on the network.

To advantage, the means for provisionally toggling from listen mode to normal mode include means for generating a signal (EnAckB) for provisionally deactivating the mode selection signal, assuming the value "0" or "1" depending on whether the mode selection signal (Autobaud) is to be provisionally deactivated or not.

BRIEF DESCRIPTION OF THE DRAWINGS

Other characteristics and advantages of the invention will emerge from reading the following description of a preferential embodiment of the invention, given by way of example and non-restrictively, and of the appended drawings, in which.

DETAILED DESCRIPTION OF ILLUSTRATIVE EMBODIMENTS

An embodiment of the invention therefore relates to a process and a device for automatically detecting the throughput of a network and for configuring with the detected throughput.

In the remainder of the description, only the situation where the network is a CAN bus is considered. It is clear however that the invention also applies to other types of network.

As already shown above and indicated on the block diagram in FIG. 1, a CAN bus 1 is a serial bus allowing a plurality of devices $2_1$, $2_2$ to $2_n$, called "control units" and each including the CAN microcontroller, to be connected.

A few essential characteristics will now briefly be given of the CAN protocol, which is a serial communication protocol implemented by a CAN bus. For more information about this CAN protocol and the CAN bus, reference may be made to ISO standard 11898, inserted here for reference purposes.

The CAN protocol distinguishes four types of CAN messages:
- data messages (Data Frame), in standard (11 bit identifier) or extended (29 bit identifier) format;
- data request messages (Remote Frame);
- error messages (Error Frame);
- network delay messages (Overload Frame);

A standard CAN message includes:
- a frame start field;
- an arbitration field, which is constituted by an identifier and a "Data Request" bit used to distinguish a data message (Data Frame) from a request message (Remote Frame);
- a control field, which contains an "extended Identifier" (IDE) and a number of data (DLC) indicating the number of data bytes which follow in the data field. In a request message, the DLC number is the number of data bytes requested;
- a data field, able to comprise up to eight bytes of data;
- a check field (CRC), guaranteeing the integrity of the message;
- an acknowledge field (ACK), composed of a slot and an acknowledgement delimiter. The bit in the acknowledgement slot is sent at a recessive level and is crushed at a dominant level by the receive devices which have at that time received the data directly;
- an end of message field (EOF);
- an inter-message field (IFS), which is a minimum number of bits separating two consecutive messages.

The CAN protocol distinguishes between five types of error, which are not mutually exclusive:
- a bit error, when the bit itself is marred by error;
- a stuff bit error;
- an ACK error;
- a CRC error;
- a structure error.

The purpose of a device connected to the CAN bus and which detects an error condition is to indicate it by transmitting an error message. These particularities mean that a device that is connected to a CAN bus must have a correct throughput configuration, at the risk of endangering the existing CAN bus or being excluded from this CAN bus.

Figure 2:
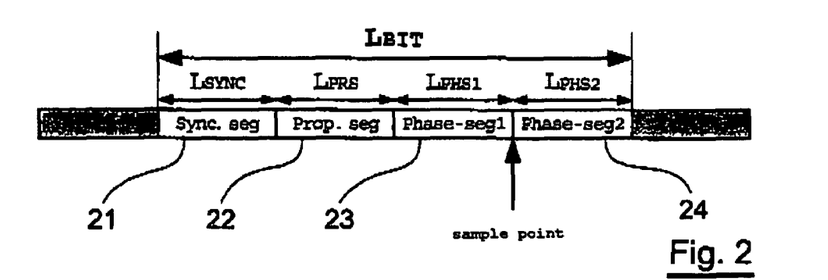
FIG. 2 shows the known structure of each bit included in a message carried on a CAN bus.

There will now be given, in relation to FIG. 2 the known structure ("CAN Bit Timing"), specified in the CAN protocol, of each bit included in a message carried on a CAN bus.

Each bit has a length $L_{BIT}$ (also called "nominal time $t_{BIT}$") and is defined by a structure consisting of four distinct segments 21 to 24.

Each of these four segments is made up of a whole number of time units (or TQ, for "Time Quanta"). The length of this time unit TQ is specified from the frequency $f_H$ or from the period $T_H$ of the device clock and from a scalar BRP specific to the device: TQ=BRP/$f_H$=BRP*$T_H$.

In a general way, the length $L_{BIT}$ of a bit may be expressed either as a number of time units TQ, or as a number of periods $T_H$ of the device clock:

$$L_{BIT}=n*TQ=n*(BRP*T_H)=m*T_H$$

The number n is such that: $8 \leq n \leq 25$.

The first segment is a synchronisation segment 21, the length of which $L_{SYNC}$ is fixed at one unit of time TQ.

The second segment 22 is a propagation segment. Its function is to compensate for the physical delay induced by the CAN bus. Its length $L_{PRS}$ is programmable between one and eight units of time TQ.

The third and fourth segments 23, 24 ("phase segment 1" and "phase segment 2") are phase segments, used to position a sample point. Their lengths $L_{PHS1}$ and $L_{PHS2}$ are also programmable.

Figure 1:
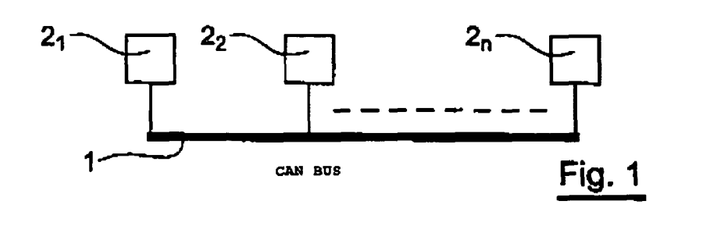
FIG. 1 shows a block diagram of a known system for interconnecting a plurality of devices using a CAN bus, a system in which the process according to an embodiment of the invention for automatically detecting and configuring the throughput can be implemented.
Figure 3:
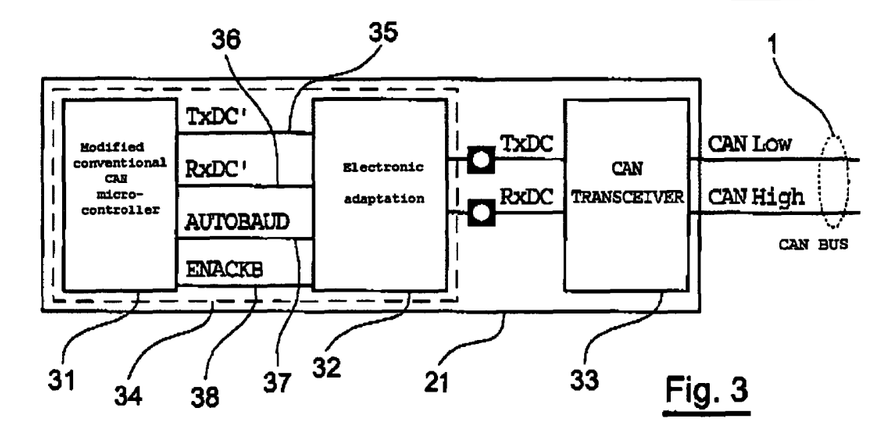
FIG. 3 shows a system block diagram of an embodiment example of a device appearing in FIG. 1 and allowing the implementation of the process according to an embodiment of the invention.

There will now be given, in relation to FIG. 3, an embodiment example of a device appearing in FIG. 1 (for example the one with the reference number $2_1$) and allowing the implementation of the process according to the invention.

Customarily, the device $2_1$ includes a conventional CAN microcontroller 31 and a CAN transceiver 33. The latter 33 is specific to the physical layer of the CAN protocol, and is designed to provide the interface between the conventional CAN microcontroller 31 (which works at the logic level) and the CAN bus 1 (which works at the physical level). The conventional CAN microcontroller 31 sends a signal 35 (hereinafter referred to as the send signal TxDC') and receives another 36 (hereinafter referred to as the receive signal RxDC').

According to an embodiment of the present invention, the conventional CAN microcontroller 31 is modified in that:
- it executes an algorithm for automatically detecting and configuring throughput (process according to the invention, described in detail below in-relation to FIGS. 5 to 16);
- it generates two control signals: a signal (Autobaud) 37 for selecting the mode and a signal 38 (EnAckB) for provisionally deactivating the mode selection signal.

The device $2_1$ is furthermore modified in that it additionally includes an electronic adaptation block 32, interfacing between the modified conventional CAN microcontroller 31 and the CAN transceiver circuit 33.

The modified conventional CAN microcontroller 31 and the electronic adaptation block 32 together form a completed CAN microcontroller 34, specific to an embodiment of the present invention.

In this way, on the one hand, the electronic adaptation block 32 receives the send signal TxDC' and the two control signals 37 (Autobaud) and 38 (EnAckB) sent by the modified conventional CAN microcontroller 3, and sends the receive signal RxDC' received by the modified conventional CAN microcontroller 3. On the other hand, the electronic adaptation block 32 sends the send signal TxDC of the completed CAN microcontroller 4, and receives the receive signal RxDC' of the completed CAN microcontroller 4.

The electronic adaptation block 32 is controlled by the mode selection signal 37 (Autobaud) in such a way that, in the course of executing the aforementioned algorithm, the device $2_1$ toggles from one to the other of the following modes:

a normal mode, in which the modified conventional CAN microcontroller 31 is able to send or receive messages on or from the CAN bus;

a listen mode, in which the modified conventional CAN microcontroller 31 is able to receive messages coming from the CAN bus but is not able to send any on this CAN bus, and in which the modified conventional CAN microcontroller 31 is able to receive any messages that it sends to the CAN bus (and which, as indicated previously, are blocked before reaching it).

The electronic adaptation block 32 is also controlled by the signal 38 (EnAckB) for provisionally deactivating the mode selection signal. By playing on the value of the latter, authorisation can be given, despite the fact that the mode selection signal implies an operation in listen mode (Autobaud=1), to move to normal mode while sending an acknowledgement field (ACK) of a received message, then to return to listen mode.

A description will now be given, in relation to FIG. 4, of a particular embodiment of the electronic adaptation block 32 appearing in FIG. 3.

It includes means for blocking messages sent by the modified conventional CAN microcontroller 31 and loop means from the output to the input of the modified conventional CAN microcontroller 31.

The mode selection signal 37 (Autobaud) assumes the value "0" if the device $2_1$ is to operate in normal mode, or "1" for an operation in listen mode.

A first AND gate 44 embodies the "AND" logic function between the mode selection signal 37 (Autobaud) and the provisional deactivation signal 38 (EnAckB). The latter is active in "0" status. In this way, when the provisional deactivation signal 38 (EnAckB) is equal to "1", the output of the first AND gate 44 is equal to the mode selection signal 37 (Autobaud). Conversely, when the provisional deactivation signal 38 (EnAckB) is equal to "0", the output of the first AND gate 44 is forced to "0", which amounts to deactivating the mode selection signal 37 (Autobaud).

The means for blocking sent messages include an OR gate 41, embodying the "OR" logic function between the output signal of the first AND gate 44 (in other words the mode selection signal 37 (Autobaud), unless it is deactivated) and the send signal (TxDC') of the modified conventional CAN microcontroller 31. The output signal of the OR gate 41 constitutes the send signal (TxDC) of the completed CAN microcontroller 34.

In this way, when the mode selection signal 37 (Autobaud) assumes the value "0" (normal mode), the send signal (TxDC') of the modified conventional CAN microcontroller 31 is merged with the send signal (TxDC) of the completed CAN microcontroller 34, and the device $2_1$ is then able to send messages on the CAN bus.

Conversely, when the mode selection signal 37 (Autobaud) assumes the value "1" (listen mode) and is not deactivated by the provisional deactivation signal 38 (EnAckB), the send signal (TxDC) of the completed CAN microcontroller 34 still has a value "1", which corresponds to a state of rest of the device (since "1" is the recessive state of the CAN bus) and therefore no message is sent by the device $2_1$ on the CAN bus.

The loop means from the output to the input of the modified conventional CAN microcontroller 31 include:

a second AND gate 42, embodying the "AND" logic function between the send signal (TxDC') of the modified conventional CAN microcontroller 31 and the receive signal (RxDC) of the completed CAN microcontroller 34;

a multiplexer 43 receiving at a first input the output signal of the second AND gate 42 and at a second input the receive signal (RxDC) of the completed CAN microcontroller 34. The output signal of the multiplexer constitutes the receive signal (RxDC') of the modified conventional CAN microcontroller 31. The multiplexer is controlled by the output signal of the first AND gate 44 (in other words the mode selection signal 37 (Autobaud), unless it is deactivated), in such a way that the first or the second input is selected depending on whether the mode selection signal assumes the value "1" or "0" respectively.

In this way, when the mode selection signal 37 (Autobaud) assumes the value "0" (normal mode), the receive signal (RxDC') of the modified conventional CAN microcontroller 31 is merged with the receive signal (RxDC) of the completed CAN microcontroller 34, and the device $2_1$ then only receives messages coming from the CAN bus.

Conversely, when the mode selection signal 37 (Autobaud) assumes the value "1" (listen mode) and is not deactivated by the provisional deactivation signal 38 (EnAckB), the receive signal (RxDC') of the modified conventional CAN microcontroller 31 is a combination (function of the second AND gate 42) of the send signal (TxDC') of the modified conventional CAN microcontroller 31 and the receive signal (RxDC) of the completed CAN microcontroller 34. Given that "1" is the recessive state of the CAN bus, this makes it possible to receive both messages coming from the CAN bus and messages sent by the modified conventional CAN microcontroller 31.

A description will now be given, in relation to the flow chart in FIG. 5, of a particular embodiment of the process according to the invention for automatically detecting and configuring throughput.

Figure 4:
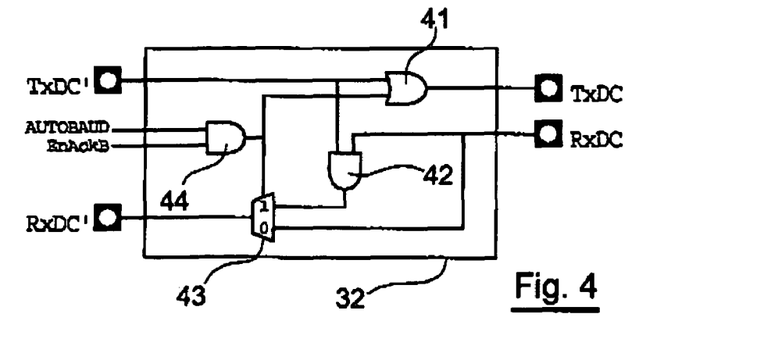
FIG. 4 shows a particular embodiment of the electronic adaptation block appearing in FIG. 3.

It includes the following steps:

a) the device goes into listen mode (see description above);

b) the device obtains a triplet of successive transitions in the signal transmitted on the network, in other words the receive signal RxDC of the completed CAN microcontroller 34 (FIG. 4). This triplet of transitions delimits a first and second signal level, one of the dominant type (signal at "0") and the other of the recessive type (signal at "1");

c) the device measures the duration, expressed as a period $T_H$ number of the device clock, of each of the first and second signal levels;

(d0) the device updates two log registers, in a way such that (cf. description of FIG. 7 below):

after the first iteration of step (d0), the registers contain the minimum P and the maximum G respectively of the durations of the first and second levels;

after each successive iteration of step (d0), the registers are updated in accordance with the following equation: if G<X, then G assumes the value X, otherwise P assumes the value X, with X the duration of the new signal level (cf. step (f3/g3) described below);

(d1) as a function of the content P and G of the two log registers, the device obtains the number m of clock periods $T_H$ included in the bit length $L_{BIT}$:

$$L_{BIT}=m*T_H;$$

(d2) as a function of the number m obtained in step (d1), the device obtains a maximum value $BRP_{MAX}$ of the scalar BRP (see description above) knowing that:

i) $L_{BIT}=m*T_H=n*BRP*T_H$, hence: m=n*BRP ii) $n=L_{BIT}/TQ$ iii) $n \leq n_{MAX}$, with $n_{MAX}$ (equal to 25) a pre-set maximum number of time units TQ that the bit length $L_{BIT}$ may include;

(d3) as a function of the number m and of the maximum value $BRP_{MAX}$ obtained in step (d2), the device obtains a value of the number n of units of time TQ included in the bit length $L_{BIT}$: $n=m/BRP_{MAX}$;

(d4) as a function of the number n obtained in step (d3), the device obtains values for the length $L_{SYNC}$ of the synchronization segment, the length $L_{PRS}$ of the propagation segment and lengths $L_{PHS1}$ and $L_{PHS2}$ of the first and second phase segments.

(e) the device validates the new throughput configuration;

(f) if the device detects the proper receipt of the useful part of a message coming from the network (positive response at step f1) (for example, by comparing a received CRC field and a CRC field recalculated from bits received), it goes provisionally to normal mode to send an acknowledgement field (ACK) on the network then goes back to listen mode (step f2), otherwise (negative response at step f1) it obtains a next transition of the signal, which delimits with the last previous transition a new signal level, and it measures the duration of the new level, expressed as a period $T_H$ number of the device clock (step (f3/g3)), then it reiterates steps (d0) to (g) taking account of the new signal level;

(g) if the device detects the correct receipt (Rx OK) of a message coming from the network (positive response at step g1), it goes to normal mode (step g2), otherwise (negative response at step g1) it performs the step with the reference number (f3/g3) detailed above, then it reiterates steps (d0) to (g) taking account of the new signal level.

As explained in detail below, an embodiment of the invention is based on a bit length $L_{BIT}$ (or "TimeBit") calculation that makes considerable use of a certain number of particularities of the CAN protocol, namely:

- an error message (Error Frame) or a network delay message (Overload Frame) comprises at least 6 dominant bits and at least 6 recessive bits;
- in a data message (Data Frame) or a data request message (Remote Frame), a dominant, and recessive level respectively, cannot be found of a duration greater than $5*L_{BIT}$;
- a data message (Data Frame) or data request message (Remote Frame) cannot include only levels of one and the same duration ($1*L_{BIT}$, $2*L_{BIT}$, $3*L_{BIT}$, $4*L_{BIT}$, or $5*L_{BIT}$);
- a data message (Data Frame) or data request message (Remote Frame) cannot include only levels of duration $1*L_{BIT}$ and $2*L_{BIT}$.

A more detailed description will now be given, in relation to FIG. 6, of obtaining transitions in the signal and measuring the duration of the levels delimited by these transitions, these operations being implemented in a number of steps ((b), (c) and (f3/g3)) appearing in the flow chart in FIG. 5. A first and a second transition 61, 62 of the receive signal RxDC delimit a first level 66 (dominant in the example shown). The second transition 62 and a third transition 63 of the receive signal RxDC delimit a second level 67 (recessive in the example shown). The third transition 63 and a fourth transition 64 of the receive signal RxDC delimit a third level 68 (dominant in the example shown). And so on and so forth, with alternating dominant and recessive levels.

The receive signal RxDC is sampled by the device clock, of period $T_H$. The duration of each of the dominant and recessive levels is evaluated by using two counters. The number of dominant samples included in each dominant level is saved by a first counter, called a dominant counter C1. The number of recessive samples included in each recessive level is saved by a second counter, called a recessive counter C2. The order to start/stop the counters C1 and C2 is always given by the transitions. Thus, a falling edge transition (as is the case with the first and third transitions with reference numbers 61 and 63) starts the dominant counter C1 and stops the recessive counter C2. A rising edge transition (as is the case with the second and fourth transitions with reference numbers 62 and 64) starts the recessive counter C2 and stops the dominant counter C1. A stopped counter C1 or C2 is reset to zero a clock period after it stops.

It is known furthermore that each of the levels, dominant or recessive, includes a whole number of bits.

The following equations can be deduced therefrom (C1 indicates here the value assumed by the dominant counter and C2 that assumed by the recessive counter):

$$C1*T_H = a*L_{BIT} = a*(m*T_H) \rightarrow C1 = a*m$$

$$C2*T_H = b*L_{BIT} = b*(m*T_H) \rightarrow C2 = b*m$$

It will be remembered that m is the number of clock periods $T_H$ included in the length of a bit $L_{BIT}$.

There are therefore three unknowns in these two equations: a, b and m. However, by using the particularities of the CAN protocol (see above), it is known that the parameters a and b cannot exceed the value 5 in the case of data messages (Data Frame) or data request messages (Remote Frame).

In the first matrix 5×5 below, all possible scenarios have been shown, as a function of a and b, together with the way of determining m as a function of C1 and C2.

|   | b | | | | |
|---|---|---|---|---|---|
| a | 1 | 2 | 3 | 4 | 5 |
| 1 | no conclusion | m = C1/2 | m = C1 | m = C1 | m = C1 |
| 2 | m = C2/2 | no conclusion | m = C2 − C1 | m = C1/2 | m = C2 − 2C1 |
| 3 | m = C2 | m = C1 − C2 | no conclusion | m = C2 − C1 | m = 2C1 − C2 |
| 4 | m = C2 | m = C2/2 | m = C1 − C2 | no conclusion | m = C2 − C1 |
| 5 | m = C2 | m = C1 − 2C2 | m = 2C2 − C1 | m = C1 − C2 | no conclusion |

This first matrix takes account of the particularities of the CAN protocol:

- For every pair of values a and b corresponding to the diagonal of the matrix (a=b), it is impossible to draw a conclusion about the value of m and the next level is awaited. In fact, this is not a problem since an iterative process is applied and it is known that in the remainder of the message received on the line of reception RxDC, it is certain that at the time of at least one iteration with another level, a case will be processed where a is different from b, which will allow a conclusion to be drawn about the value of m;
- The case a=2b or b=2a is critical. Indeed, it is not known whether two levels are involved with a duration of respectively $1*L_{BIT}$ and $2*L_{BIT}$, or $2*L_{BIT}$ and $4*L_{BIT}$. Deliberately, the division is made in twos of the smallest value between C1 and C2. This choice is justified by the fact that a message received on the line of reception RxDC, not only levels of duration $1*L_{BIT}$ and $2*L_{BIT}$ can be found. Subsequently, at the time of at least one iteration with another level, a case will be processed with a level of at least $3*L_{BIT}$, allowing the value of m to be found (in other words the length of a bit $L_{BIT}$).

The first matrix above is completely symmetrical, and it is therefore possible to reduce the analysis events by half by sequencing the coefficients a and b. Thus, it is noted P=min (C1, C2) and G=max (C1, C2), P and G being the content of the two log registers already discussed above (see step (d0) in FIG. 5). The following second matrix is then obtained:

|  | max (a, b) | | | | |
|---|---|---|---|---|---|
| min (a, b) | 1 | 2 | 3 | 4 | 5 |
| 1 | no conclusion | m = P/2 | m = P | m = P | m = P |
| 2 | | no conclusion | m = G − P | m = P/2 | m = G − 2P |
| 3 | | | no conclusion | m = G − P | m = 2P − G |
| 4 | | | | no conclusion | m = G − P |
| 5 | | | | | no conclusion |

In the course of step (d1), the value of the number m is given by the following equations, arising from the second matrix above:

$$m=\min(2P-G, G-P), \text{ if } P<G<2P \quad (1)$$

$$m=\min(G-2P,P), \text{ if } 2P<G<6P \quad (2)$$

$$m=P/2, \text{ if } G=2P \quad (3)$$

$$\text{m is not calculated in the other cases} \quad (4)$$

In practice, the tolerance of the oscillator which generates the device clock may have an unfortunate consequence over the algorithm for deciding on the value of m according to the equations (1) to (4) above. Indeed, if G is close to 2P, there is a major risk of using a wrong equation to calculate m. For this reason, an oscillator tolerance is taken into account which does not exceed the value of P/k, with k a pre-set whole number greater than or equal to 4, and preferentially equal to 8. Thus, a tolerance is accepted that is much greater than that specified in the CAN protocol.

The equations (1) to (4) above are therefore replaced by the following equations:

$$m=\min(2P-G, G-P), \text{ if } P+P/8<G\leq 2(P-P/8) \quad (1')$$

$$m=\min(G-2P,P), \text{ if } 2(P+P/8)<G<6(P-P/8) \quad (2')$$

$$m=P/2, \text{ if } 2(P-P/8)<G\leq 2(P+P/8) \quad (3')$$

$$\text{m is not calculated in the other cases} \quad (4')$$

A description will now be given, in relation to FIG. 7, of an algorithm for implementing step (d0) for updating two log registers containing the aforementioned numbers P and G. It will be remembered that these numbers P and G are used in step (d1) for obtaining the number m (FIG. 5).

At the outset (step 71), it is necessary to wait for the mode selection signal to become active (Autobaud=1). The numbers P and G assume the value FFFF by default.

If the device is activated (a signal CanEnableB goes to "0") and if the mode selection signal becomes active (Autobaud=1), go to step 72 in which the first falling edge (first transition) of the received signal RxDC is awaited.

If the first falling edge has been detected, go to step 73 in which the first rising edge (second transition) of the received signal RxDC is awaited.

If a condition indicating an error message (Error Frame) or a network delay message (Overload Frame) is detected (G>6 (P−P/8), go back to step 71.

If the first rising edge has been detected, the value C1 of the dominant counter is given to P and to G. Then, go to step 74 in which the next falling edge (third transition) of the received signal RxDC is awaited and in which a variable "EnCompare" is deactivated (by setting it to "0") triggering the calculation of the number m (see algorithm described below in relation to FIG. 9).

If the next falling edge has been detected, the value C2 of the recessive counter is given to G if C2 is greater than G, otherwise the value C2 is given to P. Additionally, the variable "EnCompare" is activated (by setting it to 1) triggering the calculation of the number m. Then, go to step 75 in which the next rising edge (fourth transition) of the received signal RxDC is awaited and in which the variable "EnCompare" is deactivated (by setting into "0") triggering the calculation of the number m.

If the next rising edge has been detected, the value C1 of the dominant counter is given to G if C1 is greater than G, otherwise the value C1 is given to P. Additionally, the variable "EnCompare" is activated (by setting it to 1) triggering the calculation of the number m. Then, go back to step 74 in which the next falling edge (fifth transition) of the received signal RxDC is awaited and in which the variable "EnCompare" is deactivated (by setting it to "0") triggering the calculation of the number m.

Figure 5:
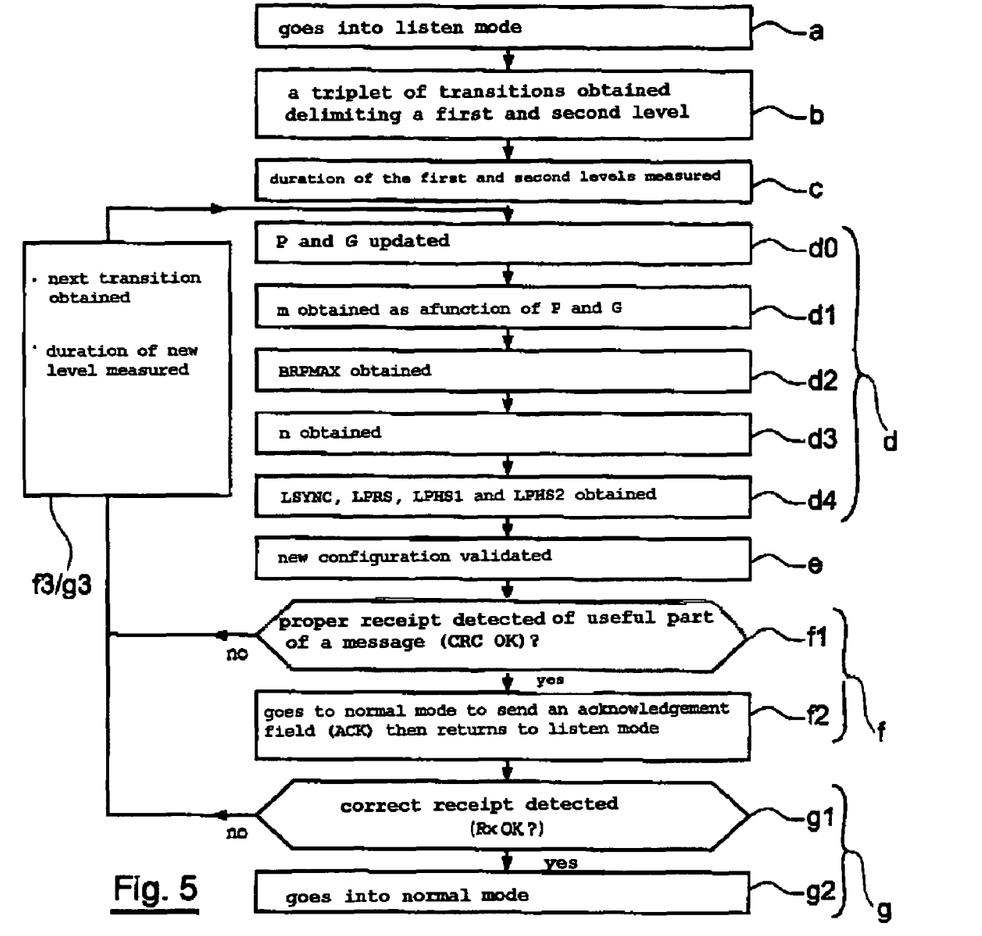
FIG. 5 shows a flow chart of a particular embodiment of the process according to an embodiment of the invention.
Figure 6:
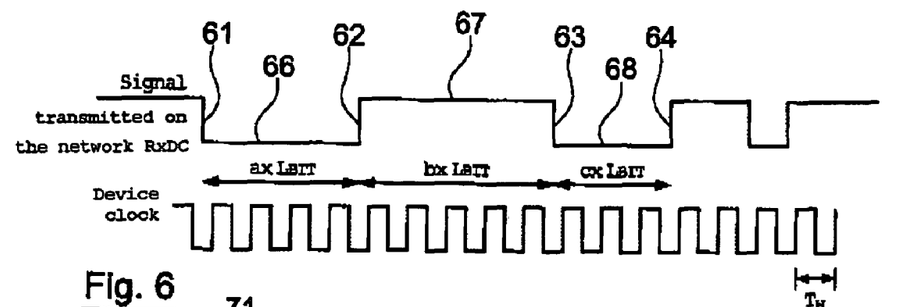
FIG. 6 shows the obtaining of transitions in the signal and the measurement of the duration of the levels delimited by these transitions, these operations being implemented in a number of steps ((b), (c) and (f3/g3)) appearing in the flow chart in FIG. 5.

During the successive transitions, the aforementioned steps 74 and 75 are carried out in a loop, and therefore the values of P and G are recalculated, so long as the mode selection signal does not become inactive (Autobaud=0) (see step (g), FIG. 5).

Figure 7:
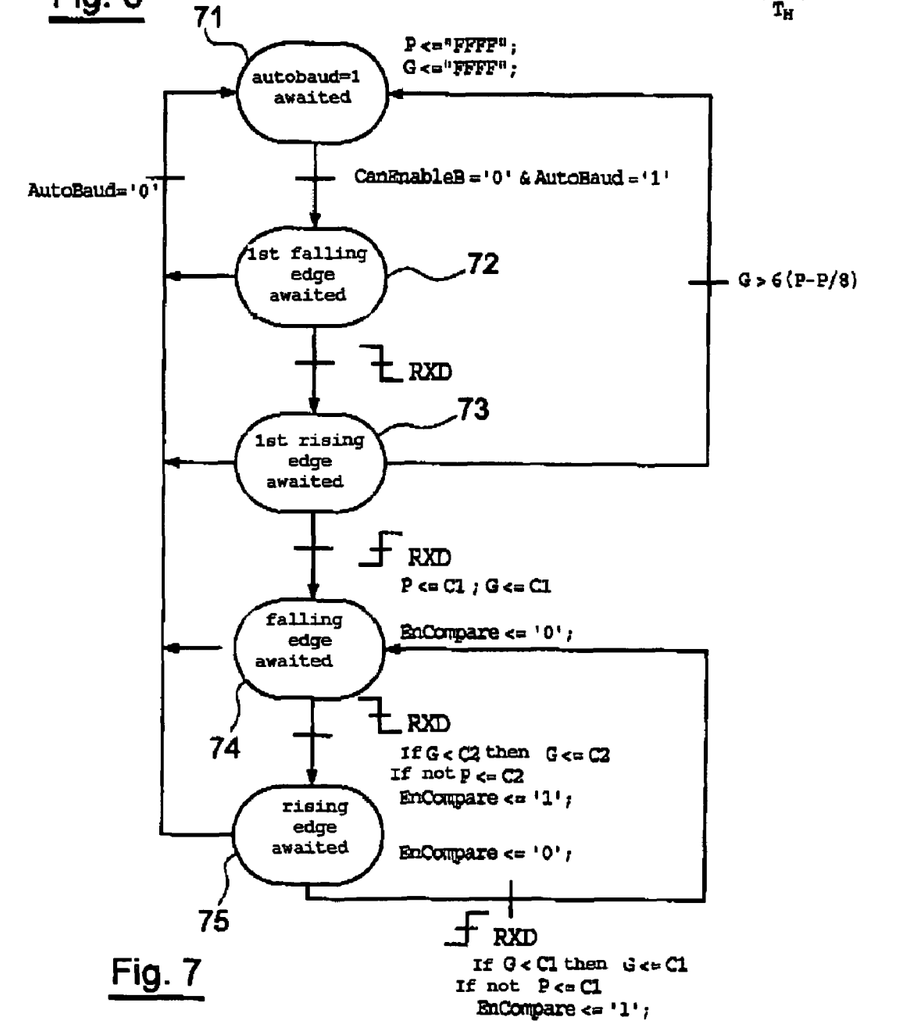
FIG. 7 shows an algorithm for the implementation of step (d0) for updating two log registers containing numbers P and G used in step (d1) for obtaining the number m, appearing in the flow chart in FIG. 5.
Figure 8:
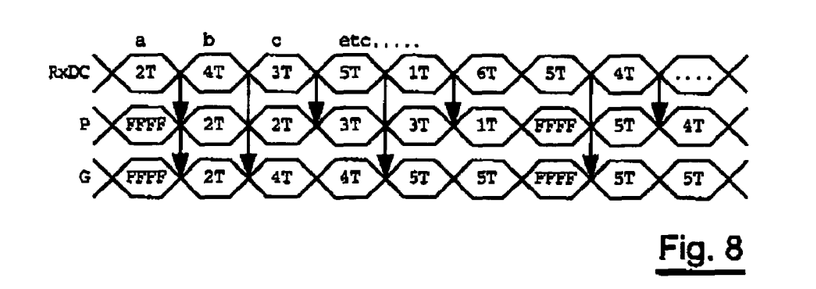
FIG. 8 shows an example of a signal transmitted on the network, with its transitions, and the values of the numbers P and G obtained with the algorithm in FIG. 7.

FIG. 8 shows an example of a received signal RxDC (signal transmitted on the network), with its transitions, and the values of the numbers P and G obtained by executing the algorithm in FIG. 7, described in detail above.

Figure 9:
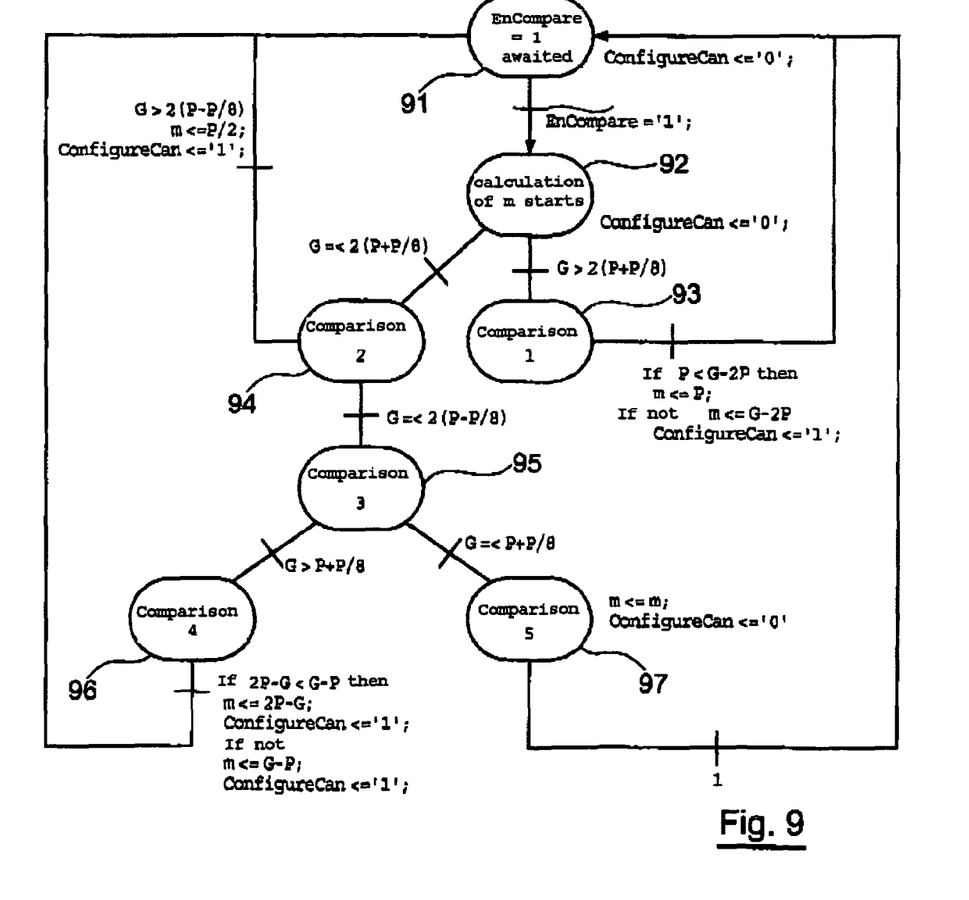
FIG. 9 shows an algorithm for implementing step (d1) for obtaining the number m, appearing in the flow chart in FIG. 5.

A description will now be given, in relation to FIG. 9, of an algorithm for implementing step (d1) for obtaining the number m (FIG. 5) from the equations (1') to (4') explained above.

At the outset (step 91) the activation is awaited (by setting to 1) of the variable "EnCompare" triggering the calculation of the number m (see algorithm described above in relation to FIG. 7). Furthermore, in this initial step 91, a variable "ConfigureCan" is deactivated (by setting it to "0") triggering the calculation of the scalar BRP (see algorithm described below in relation to FIG. 10).

If the variable "EnCompare" is activated (EnCompare=1), go to step 92 for initiating the calculation of the number m. The variable "ConfigureCan" remains deactivated.

If the condition "G>2(P+P/8)" is verified, go to step 93 corresponding to a first intermediate state (comparison 1). You are then in the situation where the aforementioned equation (2') applies. Consequently, m=min (G−2P,P). Additionally, the variable "ConfigureCan" is activated (by setting it to 1) triggering the calculation of the scalar BRP. Then, go back to the initial step 91.

If the condition "G≦2(P+P/8)" is verified, go to step 94 corresponding to a second intermediate state (comparison 2). Other comparisons should be made so as to determine which of the aforementioned equations (1'), (3') and (4') applies.

If the condition "G>2(P−P/8)" is verified, you are then in the situation where the aforementioned equation (3') applies. Consequently, m=P/2. Additionally, the variable "ConfigureCan" is activated (by setting it to 1) triggering the calculation of the scalar BRP. Then go back to the initial step 91.

If the condition "G≦2(P−P/8)" is verified, go to step 95 corresponding to a third intermediate state (comparison 3). Other comparisons should be made in order to determine which of the aforementioned equations (1') and (4') applies.

If the condition "G>P+P/8" is verified, go to step 96 corresponding to a fourth intermediate state (comparison 4). You are then in the situation where the aforementioned equation (1') applies. Consequently, m=min (2P−G, G−P). Additionally, the variable "ConfigureCan" is activated (by setting it to 1) triggering the calculation of the scalar BRP. Then go back to the initial step 91.

If the condition "G≦P+P/8" is verified, go to step 97 corresponding to a fifth intermediate state (comparison 5). You are then in the situation where the aforementioned equation (4') applies. Consequently, m is not recalculated (m=m). Additionally, the variable "ConfigureCan" remains deactivated. Then go back to the initial step 91.

A description will now be given, in relation to FIG. 10, of a block diagram of a circuit example implementing step (d2) for obtaining the maximum value $BRP_{MAX}$ of the scalar BRP (FIG. 5). This circuit is activated when the variable "ConfigureCan" is activated (ConfigureCan=1) (see algorithm described above in relation to FIG. 9).

It is known that: m=n*BRP and n≦25.

The circuit includes a multiplier 101, a counter 102, a comparator 103 and a storage register 104. The multiplier 101 receives at its two inputs the number 25 (in other words $n_{MAX}$) and the output of the counter 102. The comparator 103 receives at its first input (A) the output of the multiplier 101 and at its second input (B) the number m previously calculated (by execution of the algorithm described above in relation to FIG. 9). The output of the comparator is at "0" if its first input is lower than its second (A<B) and at "1" otherwise (A≧B). The storage register 104 is connected to the output of the counter 102. The counter 102 is controlled by a value "0" of the output of the comparator 103, while the storage register 104 is controlled by a value "1" of this same output of the comparator 103.

The operation of this circuit is as follows: the counter starts to increment from 0. So long as the condition "25×counter <m" is verified (A<B), then the output of the comparator 103 is incremented by 1. As soon as the condition "25 x counter≧m" is verified (A≧B), then the current value of counter is transferred into the storage register 104. This value is the maximum value $BRP_{MAX}$ of the scalar BRP.

A description will now be given, in relation to FIG. 11, of a block diagram of a circuit example implementing step (d3) for obtaining the number n (FIG. 5). This circuit is activated when the maximum value $BRP_{MAX}$ of the scalar BRP has been obtained (see algorithm and circuit described above in relation to FIG. 10).

It is known that: m=n*BRP and 8≦n≦25. Additionally, the maximum value $BRP_{MAX}$ of the scalar BRP has been obtained.

Figure 10:
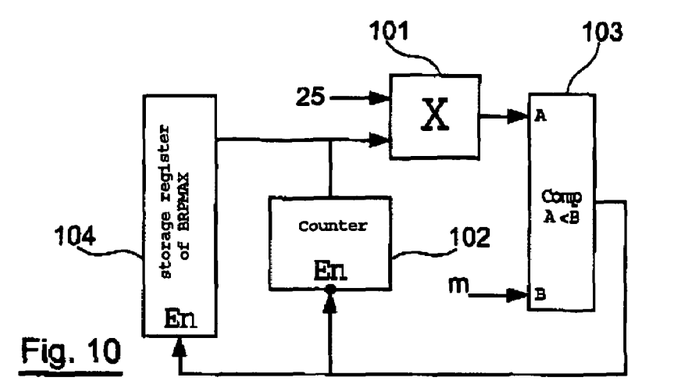
FIG. 10 shows a block diagram of a circuit example implementing step (d2) for obtaining the maximum value $BRP_{MAX}$ of the scalar BRP, appearing in the flow chart in FIG. 5.
Figure 11:
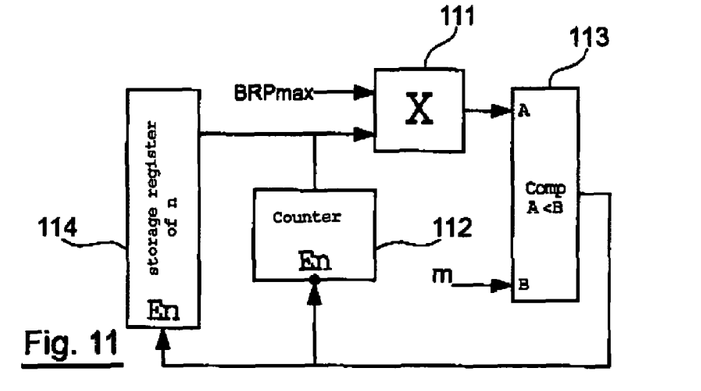
FIG. 11 shows a block diagram of a circuit example implementing the step for obtaining (d3) a number n, appearing in the flow chart in FIG. 5.

The circuit in FIG. 11 is very close to that in FIG. 10. It includes a multiplier 111, a counter 112, a comparator 113 and a storage register 114. The multiplier 111 receives at its two inputs the number $BRP_{MAX}$ and the output of the counter 112. The comparator 113 receives at its first input (A) the output of the multiplier 111 and at its second input (B) the number m previously calculated (by execution of the algorithm described above in relation to FIG. 9). The output of the comparator is at "0" if its first input is lower than its second input (A<B) and at "1" otherwise (A≧B). The storage register 114 is connected to the output of the counter 112. The counter 112 is controlled by a value "0" of the output of the comparator 113, while the storage register 114 is controlled by a value "1" of this same output of the comparator 113.

The operation of this circuit is as follows: the counter starts to increment from 7 (since n cannot be less than 8). So long as the condition "$BRP_{MAX}$×counter<m" is verified (A<B), then the output of the comparator 113 is incremented by 1. As soon as the condition "$BRP_{MAX}$×counter≧m" is verified (A≧B), then the current value of counter is transferred into the storage register 114. This value is the value of the number n.

Figure 12:
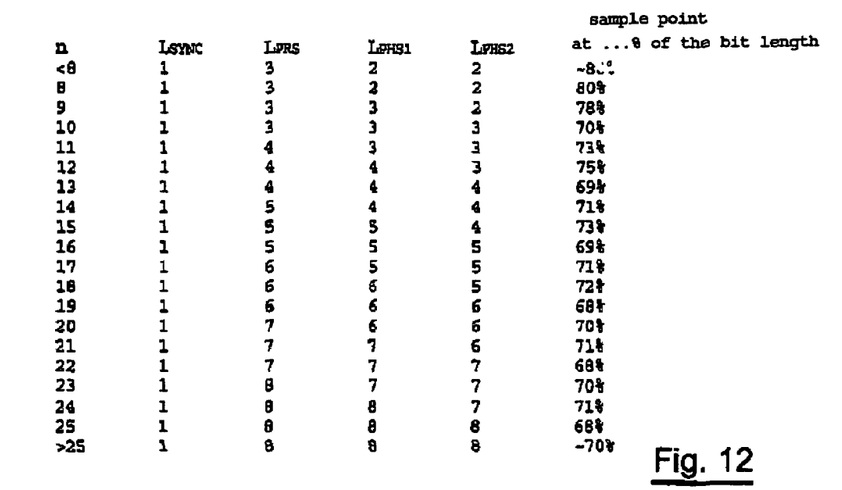
FIG. 12 shows an example of a correspondence table used in the course of step (d4), appearing in the flow chart in FIG. 5, for obtaining values for the length $L_{SYNC}$ of the synchronisation segment, the length $L_{PRS}$ of the propagation segment and the lengths $L_{PHS1}$ and $L_{PHS2}$ of the first and second phase segments.

FIG. 12 shows an example of a correspondence table used in the course of step (d4) (FIG. 5) for obtaining, as a function of the number n obtained in step (d3), values (expressed as a number of units of time TQ) for the length $L_{SYNC}$ of the synchronisation segment, the length $L_{PRS}$ of the propagation segment and the lengths $L_{PHS1}$ and $L_{PHS2}$ of the first and second phase segments.

For each value of the number n, the values of the lengths of the segments constituting the bit are calculated from the following equation:

$$n = L_{SYNC} + L_{PRS} + L_{PHS1} + L_{PHS2}$$

The values are selected so as to have a sample point around 75%. It is clear that other correspondence table are conceivable without departing from the framework of the present invention.

A description will now be given, in relation to FIG. 13, of a particular embodiment of the modified conventional CAN microcontroller according to the invention, given the reference number 31 in FIG. 3.

The modified conventional CAN microcontroller 31 includes a CPU (central processing unit) 131, communicating with a CAN controller 133 by means of a set of registers 132.

The application executed by the CPU 131 may write in certain registers (configuration registers, register defining the structure of a bit (TimeBit) 137, register for the mode selection signal (Autobaud) 138, etc.).

The CAN controller is also able to write in certain registers, known as status registers. These status registers inform the application executed by the CPU of the status of a received message (frame). A correctly received message is expressed by the writing of a bit RxOK. An erroneous message is expressed by the writing of a bit which describes the error type (stuff error SERR, bit error BERR, acknowledgment error AERR, etc.).

In the particular embodiment of the invention shown in FIG. 13, the CAN controller 133 includes a conventional module (hereinafter called CanBasic module) 134, for encoding/decoding the signal received from the CAN bus, and a module 135 (hereinafter called Autobaud module) specific to the present invention and implementing the algorithms described above. In other words, in this particular embodiment, the process according to the invention for automatically detecting and configuring throughput is implemented in hardware.

It is clear however that other embodiments of the invention are conceivable, in which part or all of the invention is able to be implemented in software, by the application executed by the CPU 131.

The control registers 136 specific to the CanBasic module 134 are not described here since they are not the subject matter of the present invention.

The register defining the structure of a bit (hereinafter called TimeBit register) 137 is absolutely necessary in order to be able to communicate on the CAN bus. Indeed, it is this which saves the configuration of a bit, in other words the values of the length $L_{SYNC}$ of the synchronisation segment, the length $L_{PRS}$ of the propagation segment and the lengths $L_{PHS1}$ and $L_{PHS2}$ of the first and second phase segments. In the case of a hardware solution where it is the Autobaud module 135 (specific to an embodiment of the present invention) which allows these values to be obtained, the application executed by the CPU 131 is only entitled to read the content of the TimeBit register 137. The Autobaud module 135 sends control signals to write in the TimeBit register 137. In this way, when a bit configuration is found, the signal WrTimeBit is generated in such a way that the values of the lengths $L_{SYNC}$, $L_{PRS}$, $L_{PHS1}$ and $L_{PHS2}$ are written in the TimeBit register 137. The CanBasic module 134 will use these values to communicate on the CAN bus and if these values are correct, the CanBasic module 134 will generate the status flag RxOK to confirm that the message has been safely received.

A register (hereinafter called Autobaud register) 138 is necessary for the mode selection signal (Autobaud). At the outset, the application executed by the CPU 131 has to write "1" into this register (generating a control signal WrCPU and a data signal DATA equal to "1" cf. FIG. 14), to start the Autobaud module 135 and therefore the different algorithms specific to the invention (see description above). Then, in case of an embodiment of the aforementioned hardware solution, the application no longer acts on the Autobaud register 138 and the Autobaud module 135 which is responsible for its management. More exactly, when the Autobaud module 135 finds a throughput configuration (writing values of the lengths $L_{SYNC}$, $L_{PRS}$, $L_{PHS1}$ and $L_{PHS2}$ in the TimeBit register 137), the CanBasic module 134 takes this configuration into account and decodes the received signal RxDC'. The CanBasic module 134 generates the status flag RxOK, when a message has been correctly received.

Figures 13, 14, 15:
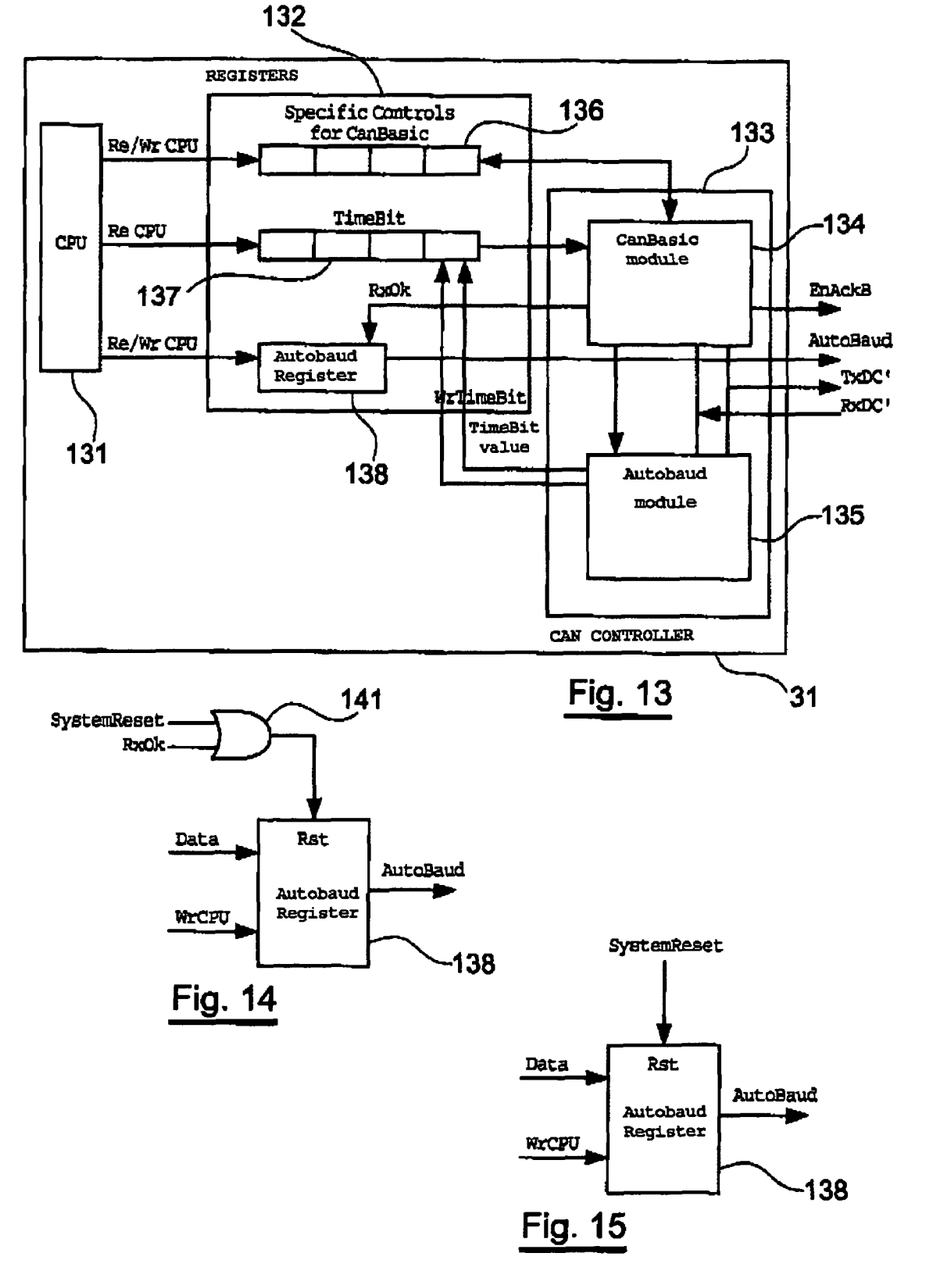
FIG. 13 is a block diagram of a particular embodiment of the modified conventional CAN microcontroller according to an embodiment of the invention, appearing in FIG. 3.
FIG. 14 shows an embodiment example of the change in value of the mode selection signal ("Autobaud") register appearing in FIG. 13.
FIG. 15 shows an embodiment variant of the change in value of the mode selection signal ("Autobaud") register.

As shown in detail in FIG. 14, this status flag RxOK resets the Autobaud register 138 to "0", which causes the Autobaud module 135 to stop instantaneously and to return to a device operation in normal mode (Autobaud=0).

It will be noted that the Autobaud register 138 can also be reset to "0" by a "SystemReset" status flag indicating a start of the device. The reset terminal (Rst) of the Autobaud register 138 is therefore brought to "0" with the output signal of an OR gate 141 the inputs of which receive the RxOK status flag and the SystemReset status flag. Solely in the interests of simplification, the SystemReset status flag has not been shown in FIG. 13.

FIG. 15 shows an embodiment variant of the change in value of the Autobaud register 138, in the event of part or all of the invention being implemented in software, by the application executed by the CPU 131.

In this case, when the application executed by the CPU 131 is informed of the generation of the RxOK status flag, it writes "1" in the Autobaud register 138. To do this, it generates a control signal WrCPU and a data signal DATA equal to "1".

In this way, only the aforementioned "SystemReset" status flag allows the Autobaud register 138 to be reset to "0".

Figure 16:
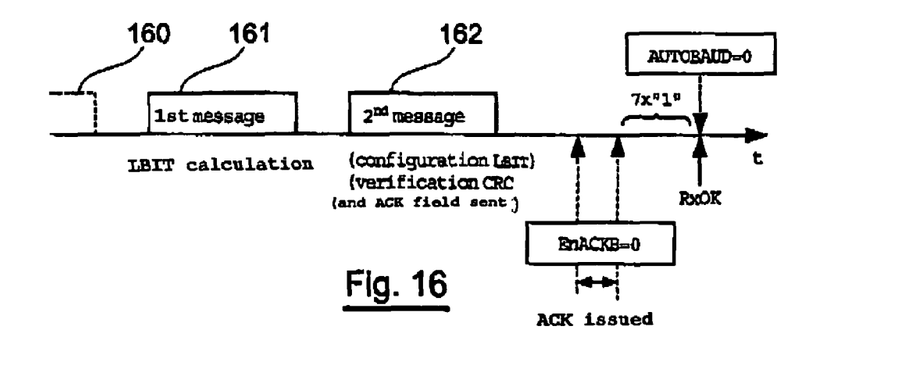
FIG. 16 shows a dynamic view illustrating the operation of the process according to an embodiment of the invention.

A description will now be given, in relation to the dynamic view in FIG. 16, of the operation process according to an embodiment of the invention.

When receiving a first message (first frame) 161, the device obtains and validates a new throughput configuration (determining values for the parameters defining the bit length $L_{BIT}$).

When receiving a second message (second frame) 162, the device confirms that the new throughput configuration is correct. The CanBasic module 134 (FIG. 13) calculates a check field value CRC (according to rules known to the man skilled in the art) and compares it with the CRC field value received by the device. Where they match, it activates the provisional deactivation signal EnAckB (by setting it to "0"), in such a way that the device sends an (ACK) field acknowledging the second message 162. Then, if the bus signal remains in the recessive status ("1") for 7 bits (7*$L_{BIT}$), the Can Basic module 134 generates the RxOK status flag, which will cause the Autobaud mode selection signal to deactivate (go to "0"), in other words the end of the execution of the process according to an embodiment of the invention.

It is important to note that the execution of the process according to an embodiment of the invention (Autobaud mode selection signal going to "1") may start at any time when receiving the first message 161 or when receiving a message 160 preceding the first message 161.

If the execution of the process according to the embodiment of the invention starts when receiving the first message 161, and if a new throughput configuration can actually be obtained, then the total execution time is less than the duration of two messages (sum of the remaining duration of the first message 161 and of the total duration of the second message 162).

In the worst case scenario, if the execution of the process according to the embodiment of the invention starts when receiving the message 160 preceding the first message 161 (but a new throughput configuration cannot be obtained when receiving this preceding message 160), then the total execution time is equal at most to the duration of three messages (sum of the duration of the preceding message 160, of the first message 161 and of the second message 162).

Although the present invention has been described with reference to preferred embodiments, workers skilled in the art will recognize that changes may be made in form and detail without departing from the spirit and scope of the invention.

What is claimed is:

1. A process for automatically detecting the throughput of a network and for configuring with the detected throughput via a device connected to the network, the network transmitting a signal on which messages are carried that include bits of length $L_{BIT}$ and of a dominant or recessive type, wherein in the process comprises the following successive steps:

a) the device goes into a listen mode, in which it is able to receive messages coming from the network but is unable to send messages on the network;
   b) the device obtains a triplet of successive transitions in the signal transmitted on the network, said triplet delimiting a first and second signal level, one dominant and the other recessive;

c) the device measures the duration, expressed as multiples of device clock period $T_H$, of each of the first and second levels;

d) as a function of the measured lengths of the signal levels, the device obtains a new throughput configuration by determining values for parameters that define the bit length $L_{BIT}$;

e) the device validates the new throughput configuration; and g) if the device detects that at least one throughput adaptation condition is verified, it goes into a normal mode, otherwise it obtains a next transition of the signal, which delimits with the last previous transition a new level of the signal, it measures the duration of the new level, expressed as multiples of device clock period $T_H$, and it reiterates steps (d) to (g) taking account of the new signal level.

2. The process according to claim 1, wherein the network is a CAN bus, and the device includes a CAN microcontroller completed relative to a conventional CAN microcontroller so as to implement the process according to the invention for automatically detecting the throughput of the network and for configuring with the detected throughput.

3. The process according to claim 2, the bit length $L_{BIT}$ being defined by:

a scalar BRP, such that: $TQ=BRP*T_H$ with TQ a unit of time and $T_H$ the period of the device clock;

lengths expressed as a number of time units TQ: length $L_{SYNC}$ of a synchronisation segment, length $L_{PRS}$ of a propagation segment for the purpose of compensating for a physical delay on the CAN bus, lengths $L_{PHS1}$ and $L_{PHS2}$ of first and second phase segments allowing a sample point to be positioned, wherein the step (d) itself includes the following steps:

(d0) the device updates two log registers, in such a way that:

after the first iteration of step (d), the registers contain the minimum P and the maximum G respectively of the durations of the first and second levels;

after each successive iteration of step (d), the registers are updated according to the following equation: if G<X, then G assumes the value X, otherwise P assumes the value X, with X the duration of the new signal level;

d(1) as a function of the content P and G of said log registers, the device obtains a number m allowing the bit length $L_{BIT}$ to be expressed as a function of the period $T_H$ of the device clock:

$L_{BIT}=m*T_H$;

(d2) as a function of the previously obtained number m, the device obtains a maximum value $BRP_{MAX}$ of the scalar BRP knowing that:

i) $L_{BIT}=m*T_H=n*BRP*T_H$, hence: $m=n*$ BRP ii) $n=L_{BIT}/TQ$ iii) $n \leq n_{MAX}$, with $n_{MAX}$ a pre-set maximum number of time units TQ that the bit length $L_{BIT}$ may include;

(d3) as a function of the number m and of the maximum value $BRP_{MAX}$ previously obtained, the device obtains a value of the number n such that: $n=m/BRP_{MAX}$;

(d4) as a function of the number n previously obtained, the device obtains values for the length $L_{SYNC}$ of the synchronization segment, the length $L_{PRS}$ of the propagation segment and lengths $L_{PHS1}$ and $L_{PHS2}$ of the first and second phase segments.

4. The process according to claim 3, wherein, in step (d1), the value of the number m is given by the following equations:

$m=\min(2P-G, G-P)$, if $P<G<2P$, $m=\min(G-2P,P)$, if $2P<G<6P$, $m=P/2$, if $G=2P$, m is not calculated in the other cases.

5. The process according to claim 4, wherein, in step (d1), the conditions for applying the equations giving the value of the number m are modified as follows:

$m=\min(2P-G, G-P)$, if $P+P/k<G \leq 2(P-P/k)$, $m=\min(G-2P,P)$, if $2(P+P/k)<G<6(P-P/k)$, $m=P/2$, if $2(P-P/k)<G \leq 2(P+P/k)$, m is not calculated in the other cases, with k a pre-set whole number greater than or equal to 4, and preferentially equal to 8.

6. The process according to claim 3, wherein, in step (d4), a pre-set correspondence table is used, associating with each value of the number n a set of values for the length $L_{SYNC}$ of the synchronisation segment, the length $L_{PRS}$ of the propagation segment and the lengths $L_{PHS1}$ and $L_{PHS2}$ of the first and second phase segments.

7. The process according to claim 1, wherein said at least one throughput adaptation condition in step (g) is the correct receipt of a message coming from the network.

8. The process according to claim 1, wherein the step (g) is preceded by the following step:

(f) if the device detects the proper receipt of the useful part of a message coming from the network, it provisionally goes into normal mode to send an acknowledgement field on the network then goes back to listen mode, otherwise it obtains a next transition of the signal, which delimits with the last previous transition a new signal level, it measures the duration of the new level, expressed as multiples of device clock period $T_H$, and it reiterates steps (d) to (g) taking account of the new signal level.

9. A device intended to be connected to a network, wherein the device includes means for automatically detecting the network throughput and for configuring with the detected throughput, the network transmitting a signal on which messages are carried including bits of length $L_{BIT}$ and of dominant or recessive type, and wherein the device further includes:

means for toggling from a normal mode to a listen mode, in which means are activated for blocking messages sent by the device to the network, the device continuing to receive messages coming from the network;

means for obtaining a triplet of successive transitions in the signal transmitted on the network, said triplet delimiting a first and second level of the signal, one dominant and the other recessive;

means for measuring the duration, expressed as multiples of device clock period $T_H$, of each of the first and second signal levels;

means for obtaining, as a function of the measured durations of the signal levels, a new throughput configuration by determining values for parameters that define the bit length $L_{BIT}$;

means for validating the new throughput configuration;

means for detecting that at least one throughput adaptation condition is verified;

means for toggling from listen mode to normal mode, activated in the event of positive detection by the detection means;

means for obtaining a next signal transition, which delimits with the last previous transition a new signal level, and means for measuring the duration of the new level, expressed as multiples of device clock period $T_H$, activated with said means for obtaining and validating a new throughput configuration and said means for detecting that at least one throughput adaptation condition is verified, in the event of negative detection by the detection means, in such a way as to take account of the new signal level.

10. The device according to claim 9, wherein the network is a CAN bus, and the device includes a CAN microcontroller completed relative to a conventional CAN microcontroller and itself including said means for automatically detecting the throughput of the network and for configuring with the detected throughput.

11. The device according to claim 10, wherein the means for toggling from normal mode to listen mode include means for generating a mode selection signal, assuming the value "0" or "1" depending on whether the device is to operate in normal mode or listen mode respectively, wherein the completed CAN microcontroller includes a modified conventional CAN microcontroller so as to itself include said means for automatically detecting the throughput of the network and for configuring with the detected throughput, apart from said means for blocking sent messages, and wherein the means for blocking sent messages include means for embodying the "OR" logic function between the mode selection signal and the send signal of the modified conventional CAN microcontroller, the output signal of the means for embodying the "OR" logic function constituting the send signal of the completed CAN microcontroller.

12. The device according to claim 11, wherein the device includes loop means from the output to the input of the modified conventional CAN microcontroller, including:

means for embodying the "AND" logic function between the second signal of the modified conventional CAN microcontroller and the receive signal of the completed CAN microcontroller;

multiplexing means receiving at a first input the output signal of the means for embodying the "AND" logic function and at a second input the receive signal of the completed CAN microcontroller, the output signal of the multiplexing means constituting the receive signal of the modified conventional CAN microcontroller, the multiplexing means being controlled by the mode selection signal in such a way that the first and second input is selected depending on whether the mode selection signal assumes the value "1" or "0" respectively.

13. The device according to claim 10, wherein the completed CAN microcontroller additionally includes means for provisionally toggling from listen mode to normal mode, so as to send an acknowledgement field on the network.

14. The device according to claim 13 wherein the means for provisionally toggling from listen mode to normal mode include means for generating a signal for provisionally deactivating the mode selection signal, assuming the value "0" or "1" depending on whether the mode selection signal is to be provisionally deactivated or not.

\* \* \* \* \*